United States Patent [19]

Porter et al.

[11] 3,840,404
[45] Oct. 8, 1974

[54] GAS DEPOLARIZATION CELL
[75] Inventors: David Frederick Porter, Eastleigh; Derek Page Redfearn, Tadley, both of England
[73] Assignee: Energy Conversion Limited, Basingstoke, Hampshire, England
[22] Filed: Nov. 8, 1971
[21] Appl. No.: 196,340

[30] Foreign Application Priority Data
Jan. 7, 1971  Great Britain .................. 735/71

[52] U.S. Cl. ........................ 136/86 A, 136/86 R
[51] Int. Cl. .................... H01m 27/00, H01m 29/04
[58] Field of Search ........................ 136/86 A, 86 R

[56] References Cited
UNITED STATES PATENTS
2,641,623  6/1953  Winckler ...................... 136/86 AU
3,378,406  4/1968  Rosansky ...................... 136/86 A
3,457,115  7/1969  Kent ............................ 136/86 A
3,594,234  7/1971  Lang et al. .................... 136/86 A FOREIGN PATENTS OR APPLICATIONS
1,178,859  1/1970  Great Britain ................. 136/86 A
1,028,342  5/1966  Great Britain ................. 136/86 A
  575,246  5/1959  Canada ........................ 136/86 A Primary Examiner—A. B. Curtis
Attorney, Agent, or Firm—Morgan, Finnegan, Durham & Pine

[57] ABSTRACT

An electrochemical cell or battery of cells which is depolarised by a gas at the cathode. A support structure or outer case for the cell or battery is so formed as to restrict the amount of depolarising gas reaching the cathode to reduce electrolyte evaporation from the cell or battery.

2 Claims, 10 Drawing Figures

GAS DEPOLARIZATION CELL

The invention relates to electrochemical cells and more particularly to gas depolarised cells such as metal/oxygen cells.

According to one aspect of the invention there is provided a gas depolarised cell which comprises at least one anode, at least one associated cathode and electrolyte at least between said anode and cathode, all enclosed within a case or held assembled by a structure, the case or structure being formed such as to allow ingress of a depolarising gas to the cathode at such a rate that the cell or cells is/are limited to be capable of maintaining a lower current drain than would be possible if the case or structure was not provided.

The case may be formed with an aperture or apertures which restrict the access of depolarising gas such as to provide the required limiting.

The case may be formed with apertures which restrict the access of depolarising gas so as to provide a required maximum current drain and selected ones of the apertures are closed by gas impermeable material located over said selected apertures.

The case may be formed with rows or rings of apertures which may be selectively closed to provide required different operating characteristics.

At least one row or ring of apertures may be closed by gas impermeable material which also serves as a label for the cell. All the apertures may be closed by selectively removable strips and the strips may comprise labels for the cell.

According to a further aspect of the invention there is provided a gas depolarised cell comprising at least one anode, at least one associated cathode and electrolyte at least between said anode and cathode, all enclosed within a case therefor, the case being formed such that the depolarising gas can diffuse therethrough, at least at portions thereof, but also being such that the passage of moisture or liquids is restricted.

The case may also be such that the depolarising gas is allowed to pass therethrough at such a rate that the cell or cells is/are limited to be capable of maintaining a lower current drain than would be possible if the case were not provided.

The case may comprise a wall or walls of material which gives rigidity to the case, said wall or walls being foraminated at least in part and at least said foraminated part having a member or layer of hydrophobic or gas permeable material positioned thereover.

Said member or layer may be porous polytetrafluoroethylene (P.T.F.E.) or alternatively said member or layer may be polyethylene film.

The case may be spaced from the cathode by a predetermined amount so as to provide a gas reservoir to provide predetermined operating characteristics for the cell.

The foregoing and further features of the invention may be more readily understood from the following description of some preferred embodiments thereof, by way of example, with reference to the accompanying drawings in which.

Figure 1:
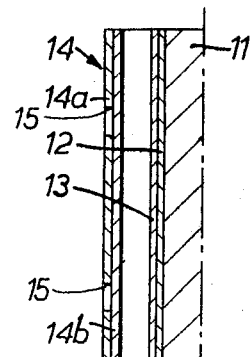
FIG. 1 is a side sectional view of half a cylindrical primary metal/oxygen cell.

Referring now firstly to FIG. 1 there is shown a side sectional view of half a primary metal/oxygen cell which comprises a centrally positioned anode 11 surrounded by a cylindrical separator 12 and cylindrical cathode 13. Electrolyte for the cell may be contained in a reservoir or reservoirs (not shown) in the anode 11 as more fully disclosed in our copending United Kingdom patent application No. 26600/69 United Kingdom Patent No. 1,256,419. No end cap arrangements are shown for the cell since these do not form a part of this invention but these could conveniently be as disclosed in our copending United Kingdom patent application No. 58918/69 U.S. application Ser. No. 94,009 now U.S. Pat. No. 3,762,956.

Surrounding the cathode 13, and spaced therefrom, is an outer case 14 which comprises a foraminated, rigid outer member 14a which could be of metal or synthetic plastics material and an inner layer 14b. The inner layer 14b may be formed of polytetrafluoroethylene which allows oxygen or air to pass therethrough but will prevent moisture entering the cell and also serve as a second barrier to electrolyte should any pass through the cathode 13 due to damage or to ageing of the cathode 13.

Alternatively the inner layer 14b may be polythene which allows oxygen or air to permeate therethrough but again will prevent moisture or electrolyte from passing therethrough.

The current of the cell may be limited by limiting the diffusivity of the layer 14b, either for example, by pressing the layer or by varying the thickness of the layer. Alternatively the cell current may be limited by providing a predetermined number and size of apertures 15 in case 14.

Figure 6:
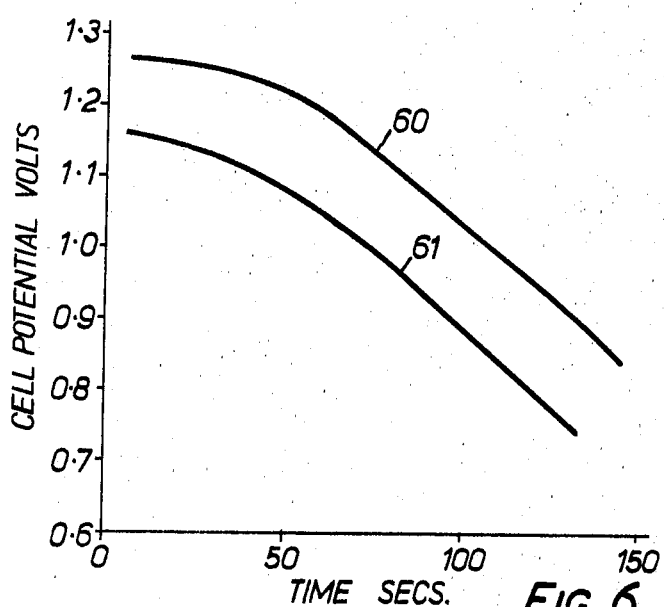
FIG. 6 is a graphical representation of voltage against time for a metal/oxygen cell in pulsed discharge showing voltage levels between and during pulses.

In this way cells can be produced which satisfy special pulsed requirements and yet problems due to evaporation of the electrolyte can be reduced or overcome. For one requirement a battery is required to provide a continuous current drain of 4 m.A. and intermittently provide pulses of 100 m.A. By making the layer 14b such that the battery will sustain only 10 m.A. continuous drain, the requirement can be fulfilled and yet evaporation problems reduced. In practice air or oxygen passes through layer 14b at a rate that would sustain 10 m.A. but since 4 m.A. only is being taken a "reservoir" of air or oxygen is collected in the space between the case 14 and cathode 13. When the 100 m.A. pulses are taken the air or oxygen is used up and then slowly builds up again until the next pulses are required. Referring to FIG. 6 such an arrangement is depicted graphically with curve 60 representing the voltage between pulses at a drain of 4 m.A. and curve 61 representing the voltage during a superimposed 250 m.Sec. pulse of 100 m.A. every second. The cell with which these curves were produced was an N-size cell with an outer case formed with one aperture of 0.024 inches diameter. It will be noted that as the oxygen or air in the reservoir is used the voltage drops and time must then be allowed to allow the reservoir to take in further oxygen or air. Further examples of the reservoir effect are given in Table 1 below:

TABLE 1

| Volume of air in closed reservoir in cm³ | in minutes Time before cell voltage falls below 1.0 volts at 100 m.A. discharge |
|---|---|
| 13.6 | 5.22 |
| 10.2 | 3.50 |
| 9.6 | 2.76 |
| 8.2 | 1.4 |

Although the arrangement is particularly suitable and advantageous when supplying pulsed loads the use is not restricted to such loads and the cell can be used for normal use.

Figure 2:
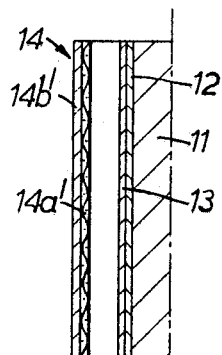
FIGS. 2 and 3 are each side sectional views of half a cell similar to that of FIG. 1.

Referring now to FIG. 2 there is shown a similar arrangement to that of FIG. 1 except that the outer case has a layer 14b' on the outside of a mesh cylinder 14a' which comprises the foraminous support.

Figure 3:
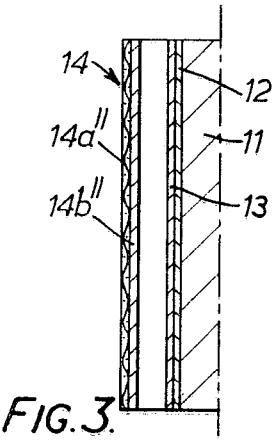

FIG. 3 shows yet a further alternative arrangement in which the mesh support 14a" is provided outside the layer 14b"

Although P.T.F.E. and polythene only have been mentioned for layer 14b this could be of any suitable material which substantially reduces the passage of moisture but allows the ingress of the depolarising gas.

Further although the layer 14b is shown as a complete cylinder it could be provided over the holes only, for example, in member 14a of FIG. 1.

Figure 4:
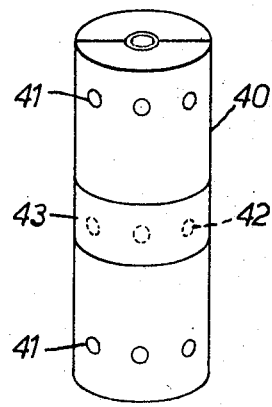
FIGS. 4 and 5 are perspective views of a primary metal/oxygen cell.
Figure 5:
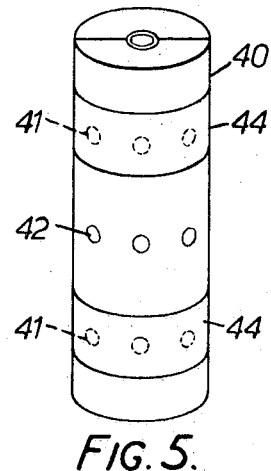

Referring now to FIGS. 4 and 5 there is shown a perspective view of a cylindrical metal/oxygen cell having an outer case 40. The anode and cathode arrangement may be the same as that shown in the cells of FIGS. 1, 2 and 3. In the cell of FIGS. 4 and 5 the case 40 is formed with a separate ring of apertures 41 at the top and bottom and a central ring of smaller apertures 42. In the FIG. 4 illustration, with the cell ready for use, the rings of apertures 41 are open to allow oxygen or air to reach the cathode and the ring of apertures 42 is covered with a strip 43 of gas impermeable material. In the FIG. 5 illustration the rings of apertures 41 are covered by strips 44 of substantially gas impermeable material (such as P.V.C. adhesive tape) and the ring of apertures 42 is left open to allow oxygen or air to reach the cathode.

With such an arrangement a single cell can be utilised to serve two different functions. The arrangement of FIG. 4 giving higher current output with shorter life and the arrangement of FIG. 5 giving lower current output with a longer life. Although in the arrangements shown merely two alternatives are depicted, further alternatives could be provided by covering or uncovering further combinations of apertures. Furthermore in the arrangements illustrated the strips 43 and 44 can be labels. The cell could be manufactured and sold with all the apertures closed, leaving the user to selectively uncover the required number of apertures for any desired use. Where label strips are used to cover the apertures these labels could indicate which should be removed for specific uses or current outputs.

Figure 7:
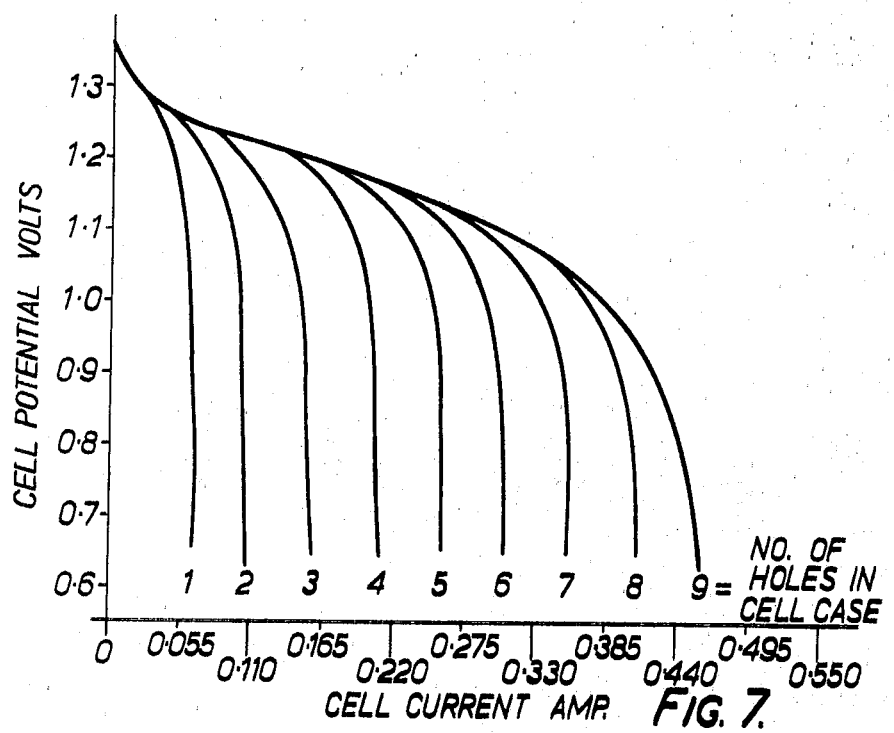
FIGS. 7, 8 and 9 are graphical representations of voltage and current showing varying polarisation of different metal/oxygen cells having cases with different numbers and sizes of apertures formed therein.

Table 2 below gives polarisation results for an N-size cell containing from one to nine holes of 0.048 inches diameter formed in the outer case. These figures are illustrated graphically in FIG. 7.

TABLE 2

| No. of holes in case | 1 | 2 | 3 | 4 | 5 | 6 | 7 | 8 | 9 |
|---|---|---|---|---|---|---|---|---|---|
| Current (Amps) | VOLTAGE (volts) | | | | | | | | |
| 0 | 1.362 | 1.361 | 1.362 | 1.362 | 1.362 | 1.360 | 1.361 | 1.362 | 1.362 |
| 0.02 | 1.290 | 1.291 | 1.290 | 1.289 | 1.290 | 1.290 | 1.290 | 1.289 | 1.290 |
| 0.04 | 1.240 | 1.258 | 1.258 | 1.258 | 1.260 | 1.260 | 1.265 | 1.262 | 1.268 |
| 0.06 | 1.020 | 1.245 | 1.246 | 1.242 | 1.243 | 1.245 | 1.249 | 1.248 | 1.251 |
| 0.08 | 0.120 | 1.212 | 1.213 | 1.230 | 1.231 | 1.232 | 1.236 | 1.235 | 1.237 |
| 0.10 | | 1.004 | 1.200 | 1.217 | 1.218 | 1.219 | 1.225 | 1.227 | 1.229 |
| 0.15 | | 0.120 | 0.961 | 1.189 | 1.191 | 1.192 | 1.193 | 1.192 | 1.193 |
| 0.20 | | | 0.130 | 0.982 | 1.152 | 1.164 | 1.166 | 1.171 | 1.170 |
| 0.25 | | | | 0.176 | 0.983 | 1.171 | 1.138 | 1.142 | 1.136 |
| 0.30 | | | | | 0.220 | 0.900 | 1.080 | 1.100 | 1.100 |
| 0.35 | | | | | | 0.247 | 0.892 | 1.047 | 1.050 |
| 0.40 | | | | | | | 0.291 | 0.840 | 0.960 |
| 0.45 | | | | | | | | 0.331 | 0.728 |
| 0.50 | | | | | | | | | 0.360 |

Figure 8:
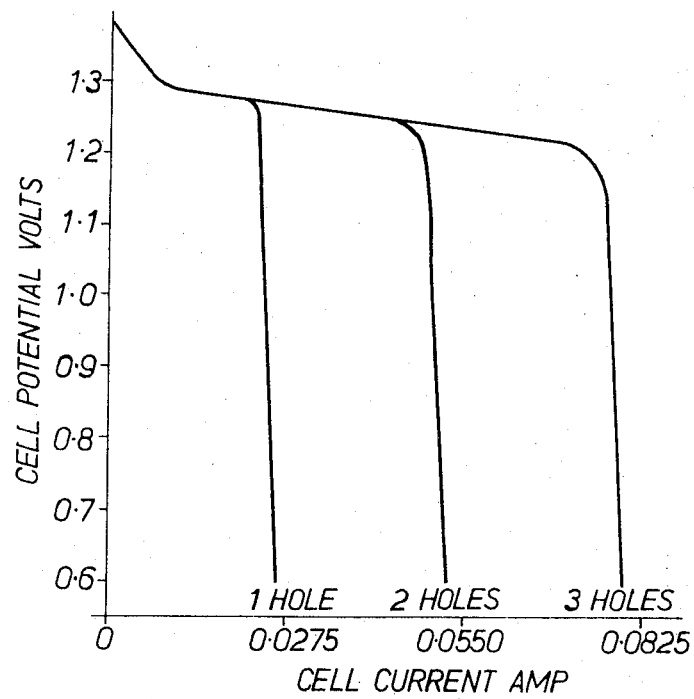

Tables 3, 4 and 5 below give, respectively, the polarisation results for N-size cells having one, two and three apertures of 0.024 inches diameter formed in the outer case. These results are depicted graphically in FIG. 8.

TABLE 3

| Current Amps | Cell voltage |
|---|---|
| 0 | 1.390 |
| 0.014 | 1.276 |
| 0.022 | 1.263 |
| 0.024 | 1.018 |
| 0.033 | 0.420 |

TABLE 4

| Current Amps | Cell voltage |
|---|---|
| 0 | 1.390 |
| 0.013 | 1.294 |
| 0.026 | 1.273 |
| 0.045 | 1.230 |
| 0.050 | 0.850 |
| 0.060 | 0.221 |

TABLE 5

| Current Amps | Cell voltage |
|---|---|
| 0 | 1.391 |
| 0.011 | 1.288 |
| 0.025 | 1.268 |
| 0.043 | 1.248 |
| 0.053 | 1.236 |
| 0.063 | 1.223 |
| 0.068 | 1.214 |
| 0.080 | 0.500 |

Figure 9:
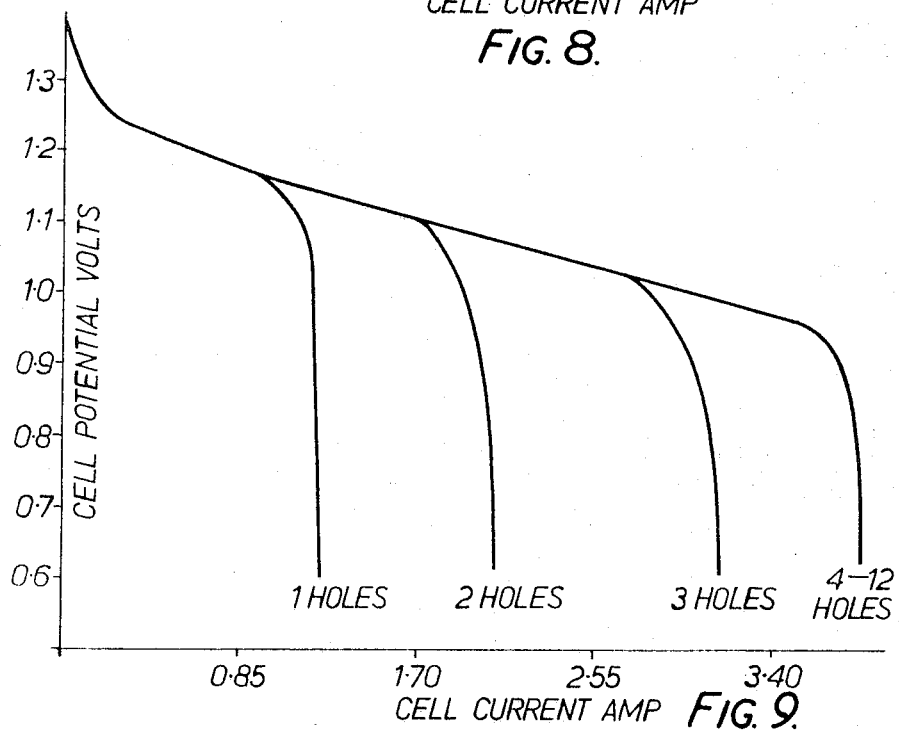

Table 6 below gives polarization results for D-size cells containing from one to twelve apertures of 3/16 inches diameter formed in the outer case. These results are depicted graphically in FIG. 9. It will be seen from the results that four apertures and above do not give any limiting of the current output.

TABLE 6

| No. of holes in case | 1 | 2 | 3 | 4 | 6 | 8 | 10 | 12 |
|---|---|---|---|---|---|---|---|---|
| Current, Amp. | | | | Cell Voltage | | | | |
| 0 | 1.374 | 1.375 | 1.374 | 1.375 | 1.377 | 1.376 | 1.375 | 1.376 |
| 0.250 | 1.241 | 1.240 | 1.244 | 1.245 | 1.246 | 1.247 | 1.246 | 1.249 |
| 0.500 | 1.200 | 1.196 | 1.202 | 1.200 | 1.203 | 1.203 | 1.219 | 1.213 |
| 0.750 | 1.173 | 1.172 | 1.180 | 1.177 | 1.180 | 1.183 | 1.197 | 1.185 |
| 1.000 | 1.144 | 1.156 | 1.167 | 1.159 | 1.165 | 1.170 | 1.176 | 1.159 |
| 1.50 | 0.312 | 1.113 | 1.122 | 1.123 | 1.128 | 1.131 | 1.143 | 1.126 |
| 2.00 | | 0.113 | 1.080 | 1.080 | 1.087 | 1.094 | 1.113 | 1.083 |
| 2.50 | | | 1.038 | 1.039 | 1.049 | 1.053 | 1.073 | 1.044 |
| 3.00 | | | 0.920 | 1.012 | 1.010 | 1.016 | 1.020 | 1.001 |
| 3.50 | | | | 0.900 | 0.954 | 0.960 | 0.970 | 0.968 |
| 4.00 | | | | 0.710 | 0.220 | 0.217 | 0.200 | 0.218 |

Figure 10:
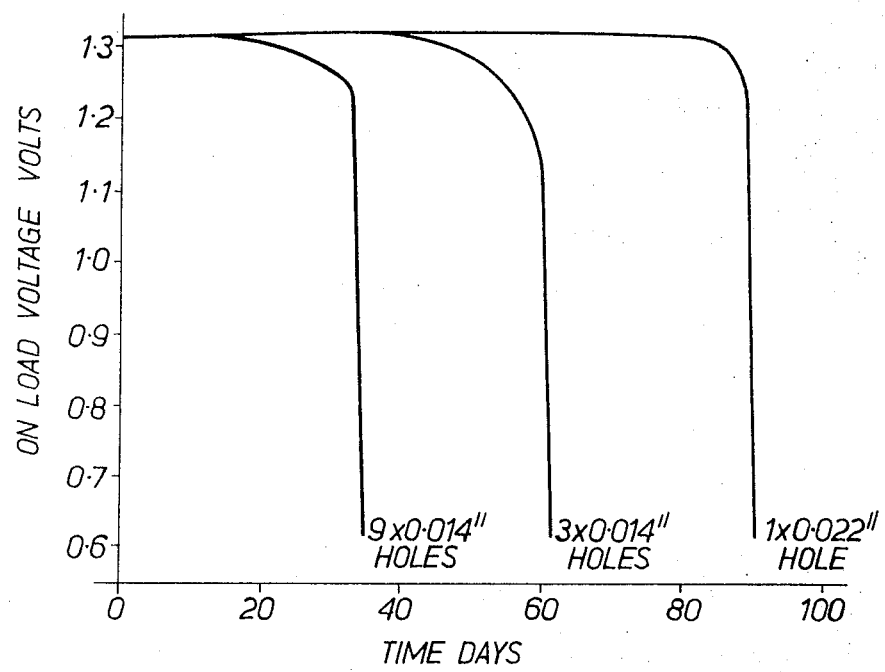
FIG. 10 is a graphical representation of voltage against time showing varying active life of similar cells with different apertures formed therein.

The advantage of limiting the current for any particular use of the cell is that this reduces the evaporation loss of the electrolyte of the cell and prolongs the active life of the cell. This is borne out by the results given in Table 7 below in respect of N-size cells with different numbers and sizes of apertures formed in the outer case. These results are depicted graphically in FIG. 10.

TABLE 7

| | Cell Voltage | | |
|---|---|---|---|
| No. of days on test | 9 × 0.014" holes | 3 × 0.014" holes | 1 × 0.022" holes |
| 0 | 1.315 | 1.308 | 1.313 |
| 6 | 1.318 | 1.313 | 1.304 |
| 13 | 1.315 | 1.313 | 1.319 |
| 16 | 1.307 | 1.312 | 1.320 |
| 20 | 1.292 | 1.311 | 1.319 |
| 27 | 1.282 | 1.311 | 1.321 |
| 30 | 1.283 | 1.312 | 1.323 |
| 34 | 1.262 | 1.315 | 1.327 |
| 39 | — | 1.306 | 1.318 |
| 40 | — | 1.311 | 1.322 |
| 50 | — | 1.289 | 1.322 |
| 61 | — | 0.752 | 1.320 |
| 69 | — | | 1.319 |
| 76 | — | | 1.317 |
| 86 | — | | 1.308 |
| 92 | — | | 0.210 |

These active life results above are further borne out by evaporation rate tests performed with N-size cells containing eight molar aqueous potassium hydroxide solution electrolyte. With tests performed at 30°C with 30 percent relative humidity a cell with three apertures of 0.024 inches diameter had an evaporation rate of 0.0099 grams per day whilst a cell with nine apertures of 0.048 inches diameter had an evaporation rate of 0.0215 grams per day. These tests were repeated at 55°C and 10 percent relative humidity and the evaporation rates were 0.109 grams per day and 0.208 grams per day respectively.

Although the invention has been described as related to outer cases for single cells it applies equally to batteries of cells contained in a single outer case or box suitably apertured. This will be seen to be the case from Table 8 below which relates to a box containing 22 D-size cells, with each hole diameter being 0.5 inches.

TABLE 8

| No. of holes open | Current (amps) at 22 volts |
|---|---|
| 2 | 0.2 |
| 8 | 2.03 |
| 14 | 2.67 |
| 20 | 3.50 |
| 24 | 3.24 |
| 28 | 3.38 |
| 35 | 3.45 |
| 39 | 3.55 |
| 48 | 3.59 |
| 58 | 3.66 |
| 66 | 3.73 |

In a cell or battery which does not have an outer case as such air access can be restricted by providing a reduced aperture or air path in the support structure for the cell at the point of access of air to the cathode. In further alternatives the structure could include a gas restricting material, e.g. wadding, in the air access path, or the air access to the cathode could be through restricted diffusivity seals or other portions of the cell or battery structure.

What is claimed is:

1. A gas depolarization cell capable of delivering a relatively high current drain under intermittent short term current demand and a continuous relatively low current drain under normal operating conditions, comprising:
   A. an anode;
   B. a cathode disposed for exposure to a depolarizing gas;

C. a separator separating the anode and the cathode;

D. an electrolyte disposed between the anode and the cathode;

E. a casing surrounding the anode, separator, electrolyte, and cathode, said casing being spaced from the cathode by a predetermined amount to provide a gas reservoir between the cathode and casing for receiving and storing depolarizing gas, said casing being generally impermeable to gas, electrolyte, and moisture and including a predetermined number of apertures arranged therein with an inner liner contiguous to said casing, said inner liner impeding the passage of electrolyte and moisture through said apertures while allowing the introduction of gas to the reservoir through said apertures at a predetermined rate which is greater than the rate required to maintain continuous normal current drain and less than the rate required to deliver the intermittently required high current drain so that gas accumulates in said gas reservoir to provide sufficient gas for the intermittent short term high current drain thereby reducing the rate of evaporation of electrolyte and moisture and prolonging the active life of the gas depolarization cell.

2. A gas depolarization cell as described in claim 1 wherein the separator, cathode, and casing have a tubular configuration and are substantially coaxial with the anode.

* * * * *